(12) United States Patent
Bittner

(10) Patent No.: US 11,800,860 B2
(45) Date of Patent: Oct. 31, 2023

(54) MULTI-AXIS LINKAGE FOR USE WITH A COLLAPSIBLE BOOM AND AGRICULTURAL VEHICLE HAVING SAME

(71) Applicant: CNH Industrial America LLC, New Holland, PA (US)

(72) Inventor: Roy A. Bittner, Cato, WI (US)

(73) Assignee: CNH INDUSTRIAL AMERICA LLC, New Holland, PA (US)

(*) Notice: Subject to any disclaimer, the term of this patent is extended or adjusted under 35 U.S.C. 154(b) by 1018 days.

(21) Appl. No.: 16/546,881

(22) Filed: Aug. 21, 2019

(65) Prior Publication Data

US 2021/0051942 A1 Feb. 25, 2021

(51) Int. Cl.
| | | |
|---|---|---|
| A01M 7/00 | (2006.01) | |
| A01M 21/04 | (2006.01) | |
| A01C 23/04 | (2006.01) | |
| B05B 13/00 | (2006.01) | |

(52) U.S. Cl.
CPC ......... *A01M 7/0075* (2013.01); *A01M 7/0042* (2013.01); *B05B 13/005* (2013.01)

(58) Field of Classification Search
CPC .............. A01M 7/0075; A01M 7/0071; A01B 73/04–44; A01B 73/065; A01B 63/02; A01B 63/10; B64C 25/20–22
See application file for complete search history.

(56) References Cited

U.S. PATENT DOCUMENTS

| | | | |
|---|---|---|---|
| 2,049,109 A | * | 7/1936 | Dowty .................... B64C 25/20 244/102 R |
| 4,046,203 A | | 9/1977 | Ward |
| 4,074,766 A | | 2/1978 | Orthman |
| 4,281,720 A | | 8/1981 | Tusing |
| 4,400,994 A | | 8/1983 | Skjaeveland |
| 4,418,763 A | | 12/1983 | Boetto |
| 4,453,601 A | | 6/1984 | Orthman et al. |
| 5,135,057 A | | 8/1992 | Dircks |

(Continued)

FOREIGN PATENT DOCUMENTS

| | | |
|---|---|---|
| CA | 2254801 A1 | 5/2000 |
| CN | 203775984 U | 8/2017 |

(Continued)

OTHER PUBLICATIONS

Grainger; Soss Hidden Barrel Hinge Without Holes, Satin Brass Finish, 27/64" x 27/64"—4ACY3; https://www.grainger.com/product/SOSS-Hidden-Barrel-Hinge-Without-4ACY3; website date printed Nov. 14, 2018—(4) pages.

*Primary Examiner* — Tuongminh N Pham
(74) *Attorney, Agent, or Firm* — Rebecca Henkel; Rickard DeMille

(57) ABSTRACT

A multi-axis linkage for use with a collapsible boom of an agricultural vehicle is disclosed. The collapsible boom includes a first boom segment having a first truss and a second boom segment having a second truss. The multi-axis linkage includes a first linear motor, a second linear motor, and a multipoint winged link. The first linear motor has a piston rod. An end of the piston rod is coupled to the first truss. The second linear motor has a second piston rod. An end of the second piston rod is coupled to the second truss. The multipoint winged link connects to the first linear motor, the second linear motor, the first boom segment, and the second boom segment.

18 Claims, 13 Drawing Sheets

(56) References Cited

U.S. PATENT DOCUMENTS

| | | | |
|---|---|---|---|
| 5,957,383 A | | 9/1999 | Benest |
| 6,027,039 A | * | 2/2000 | Mercil ................ A01M 7/0075 239/161 |
| 9,848,592 B2 | | 12/2017 | Peters et al. |
| 2017/0027152 A1 | | 2/2017 | Hiddema et al. |
| 2017/0334542 A1 | | 11/2017 | Stanley et al. |

FOREIGN PATENT DOCUMENTS

| | | |
|---|---|---|
| DE | 102011051088 B4 | 7/2014 |
| EP | 1525784 B1 | 2/2008 |
| EP | 3053436 A1 | 8/2016 |
| EP | 2989875 B1 | 12/2017 |
| GB | 442133 | 2/1936 |

\* cited by examiner

MULTI-AXIS LINKAGE FOR USE WITH A COLLAPSIBLE BOOM AND AGRICULTURAL VEHICLE HAVING SAME

FIELD OF THE INVENTION

The invention relates generally to agricultural machines including agricultural product application equipment such as self-propelled sprayers and, in particular, to agricultural vehicles having a collapsible boom with a multi-axis linkage.

BACKGROUND OF THE INVENTION

Current spray boom designs have exposed fold cylinders. This has the potential of causing airflow turbulence that may affect the spray pattern locally, causing streaking of the spray pattern in some wind conditions and at higher ground speeds. Also, the cylinder position may limit the ability to fold the boom compactly.

Most common fold methods common in today's market utilize a 4 bar linkage actuated by a single, relatively long hydraulic cylinder. Most often, the cylinder and linkage lie between the two halves of the folded truss, requiring the folded assembly to be dimensional larger than it could be. A new fold linkage for a collapsible boom is desired.

SUMMARY OF THE INVENTION

In embodiments, the invention relates to a greater than 180 degree folding hinge in a sprayer boom that positions the cylinder and linkage to both minimize wind turbulence in the operating position and maximize compactness of the overall boom when folded. In at least one construction, the linkage includes two cylinders mounted in a trunnion style with a winged-style link. The cylinders can lie within the volume of the truss halves when in the operating position, and extend out of the end of the truss when folded. The cylinders and link are less exposed to the wind while in the operating position, and do not lie between the truss halves when folded.

According to one aspect of the invention, a multi-axis linkage for use with a collapsible boom of an agricultural vehicle is disclosed. The collapsible boom includes a first boom segment having a first truss and a second boom segment having a second truss. The multi-axis linkage includes a first linear motor, a second linear motor, and a multipoint winged link. The first linear motor has a piston rod. An end of the piston rod is coupled to and within an end of the first truss. The second linear motor has a piston rod. An end of the piston rod of the second linear motor is coupled to and within an end of the second truss. The multipoint winged link has a first knuckle portion connected to the first linear motor, a second knuckle portion connected to the second linear motor, and a third knuckle portion coupled to the first boom segment and the second boom segment.

According to at least one more detailed aspect of the invention, a multi-axis linkage for use with a collapsible boom of an agricultural vehicle is disclosed. The collapsible boom includes a first boom segment having a primary tube and a second boom segment having a secondary tube. The multi-axis linkage includes a first ferrule link having a ferrule portion with a ferrule coupled in the primary tube, a knuckle portion, and a leaf portion connecting the ferrule portion and the knuckle portion. A second ferrule link has a ferrule portion with a ferrule coupled in the secondary tube, a knuckle portion, and a leaf portion connecting the ferrule portion and the knuckle portion. A first linear motor has a piston rod, the end of the piston rod being connected to the ferrule of the first ferrule link within the primary tube. A second linear motor has a piston rod, the end of the piston rod being connected to the ferrule of the second ferrule link within the secondary tube. A multipoint winged link has a first knuckle portion connected to the first linear motor, a second knuckle portion connected to the second linear motor, and a third knuckle portion coupled to the knuckle portion of the first ferrule link and the knuckle portion of the second ferrule link.

According to another aspect of the invention, an agriculture vehicle having a collapsible boom is disclosed. The agricultural vehicle includes a first boom segment having a first truss and a second boom segment having a second truss. The agriculture vehicle further includes the multi-axis linkage coupling the first boom segment and the second boom segment according to one or more aspects of the invention.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
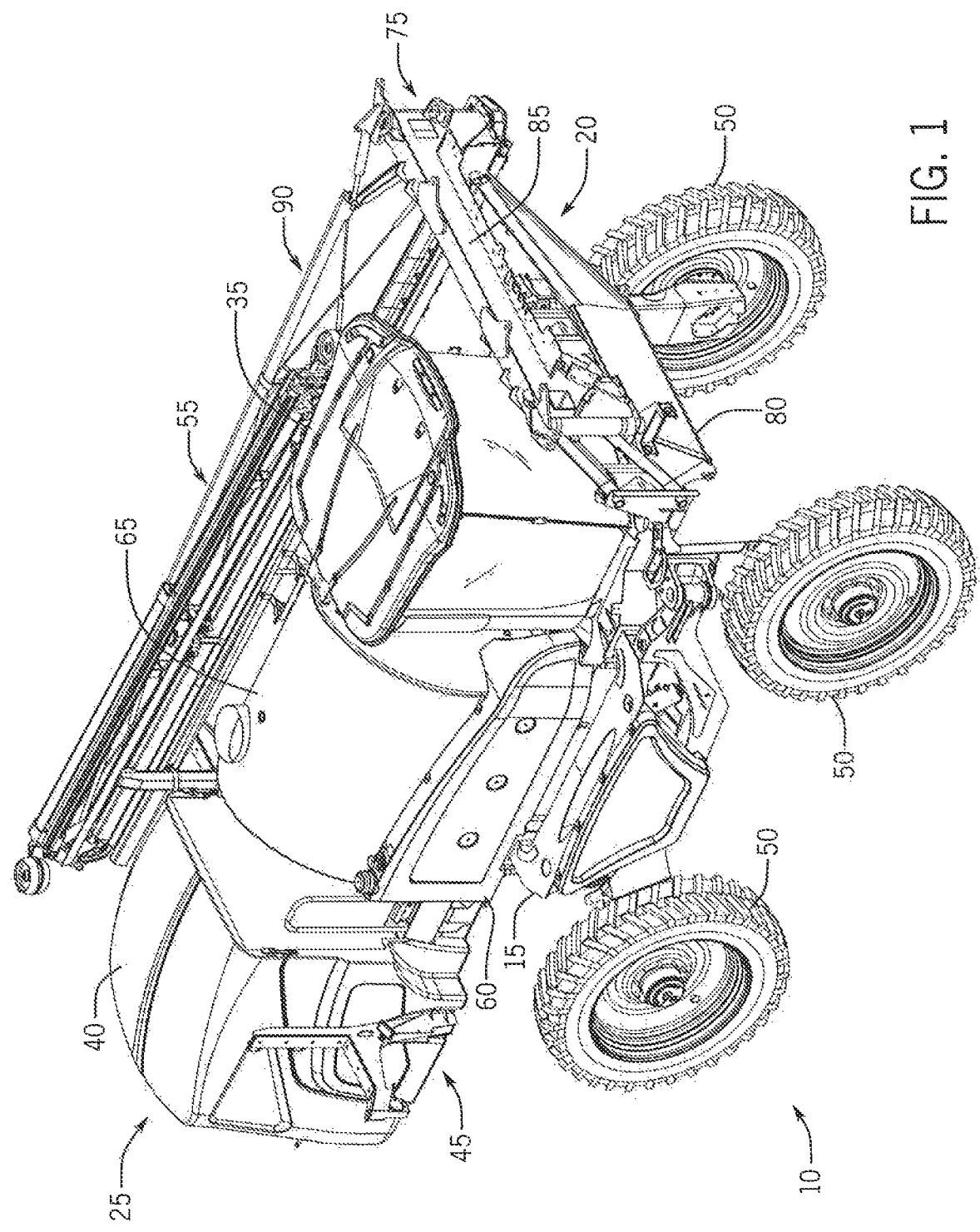
FIG. 1 is an isometric view from a first perspective of a front-boom sprayer, where a boom is in a raised position, and the left boom arm is in a retracted position.

Referring now to the drawings and specifically to FIGS. 1-4, aspects of the invention are shown for use with an agricultural vehicle, which is shown in the figures to be an agricultural sprayer vehicle (referred to herein as simply a "sprayer") 10. The sprayer 10 is shown as a front-boom sprayer, such as those available from CNH Industrial, including the Miller Nitro sprayers and New Holland Guardian Series sprayers. Other arrangements for the sprayer 10 are contemplated, including a rear-mounted configuration boom sprayer, such as those available from CNH Industrial, including the Miller Condor Series sprayers and New Holland Guardian Series rear-boom sprayers. Moreover, other agriculture machines and vehicles incorporating aspects of the invention are contemplated, including agriculture vehicles having a boom.

The sprayer 10 includes a frame or chassis 15 having front and back ends 20 and 25, respectively. The chassis 1 provides structural support for various assemblies, systems, and components of the sprayer 10. These various assemblies, systems, and components can include an operator cab 35 in a forward position toward the front end 20 of the chassis 15. An engine 40 and a hydraulic system 45 are shown in a rearward position toward the back end 25 of the chassis 15. The hydraulic system 45 receives power from the engine 40 and includes at least one hydraulic pump which can be in a hydrostat arrangement. The hydraulic pump(s) provide hydraulic pressure for operating hydraulic components within the hydraulic system 45. For sprayers with hydrostatic drives, hydraulic motors are operably connected to the hydraulic pump(s) for rotating wheels 50 of the sprayer 10. In mechanical drive applications, a mechanical transmission receives power from the engine 40 and delivers power for rotating the wheels 50 by way of power-transmitting driveline components. Example power-transmitting driveline components include drive shafts, differentials, and other gear sets in portal, drop boxes, or other housings.

A spray-application system 55 is supported by the chassis 15. The spray-application system 55 includes storage containers, such as a rinse tank 60 for storing water or a rinsing solution and a product tank 65 for storing a volume of product for delivery onto an agricultural field with the sprayer 10. The product includes any of a variety of agricultural liquid products, such as various pesticides, herbicides, fungicides, liquid fertilizers, and other liquids including liquid suspensions beneficial for application onto agricultural fields. A product delivery pump can convey product from the product tank 65 through plumbing components to nozzle bodies. The plumbing components includes a piping system for transport of the product. The nozzle bodies are spaced from each other along the width of an application boom (simply referred to as boom 75 herein) during spraying operations of the sprayer 10. To simplify the figures, only a small number of the nozzle bodies are shown in some of the figures and not all of the piping system is shown. One skilled in the art will know to extrapolate and expand the number of nozzle bodies and piping system as necessary. Groups or banks of multiple adjacent nozzle bodies define multiple spray segments of the spray system. Spray segments are defined along the boom 75 and selectively deliver product for release onto an agricultural field at locations corresponding to positions of activated spray segments.

Figure 2:
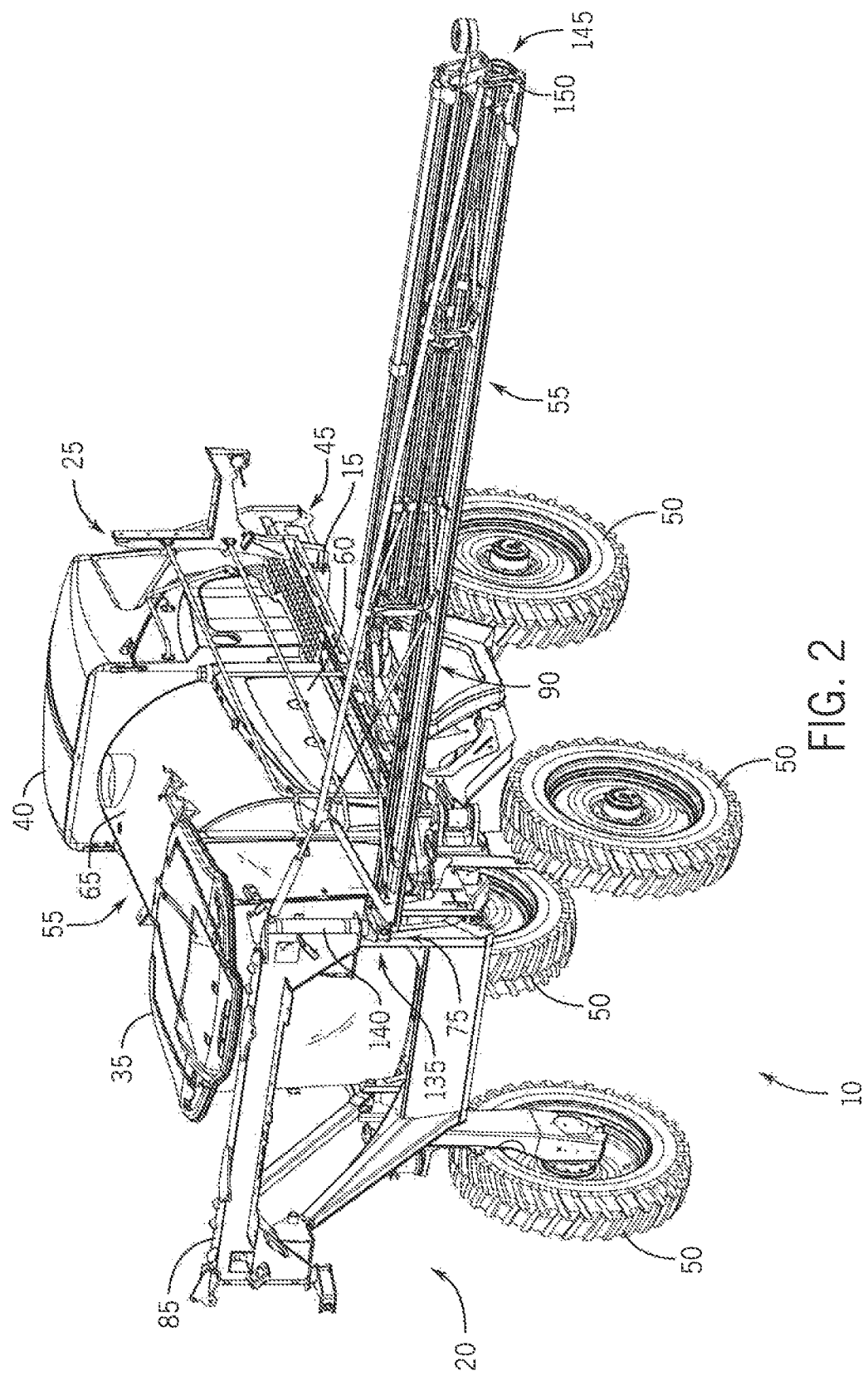
FIG. 2 is an isometric view from a second perspective of the front-boom sprayer of FIG. 1, where the boom is in a raised position, the right boom arm is removed, a first boom arm segment of the left boom arm is in an extended positioned, and second and third boom arm segments of the left boom arm are in the retracted position.

The boom 75 is connected to the chassis 15 with a lift arm arrangement or assembly 80. The lift arm assembly 80 is attached to a boom center section 85. The lift arm assembly 80 is configured to move the boom 75 up and down for adjusting the height of application of the product and/or to raise the boom 75 above objects (e.g., agricultural product). FIGS. 1 and 2 show the boom in a raised position, and FIGS. 3 and 4 show the boom in a lowered position.

Coupled to the boom center section 85, the boom 75 has multiple interconnected segments that collectively define each of a left and right boom arm, respectively. Left and right for the boom 85 are defined with respect to an operator's view of the boom 75 from the operator cab 35. Left and right boom arms extend in opposite directions from the boom center section 85. The left and right boom arms are mirror identical about a longitudinal axis of the sprayer 10, and thus, only left boom arm 90 is shown and described in further detail. For simplicity, FIGS. 1-4 show the right boom arm removed. FIG. 1 shows the left boom arm 90 in a retracted, or transport, position. FIGS. 2-4 show the left boom arm 90 in an extended position.

The left boom arm 90 has multiple segments, including first, second, and third boom arm segments 100, 105, and 110 (FIG. 4), respectively. The number of boom arm segments can vary among sprayer designs. Collectively, the boom center section 85, the left boom arm 90, and the right boom arm define the boom 75, which has left and right ends, respectively. The boom 75 has an inner facing or inward side 125 that faces toward the operator cab 35 and provides a vehicle mounting surface(s) with mounting structures configured for mounting the boom 75 to the lift arm assembly 80. Opposite the inner facing side 125 is an outer facing or outward side 130 of the boom 75 that faces away from the operator cab 35.

Figure 3:
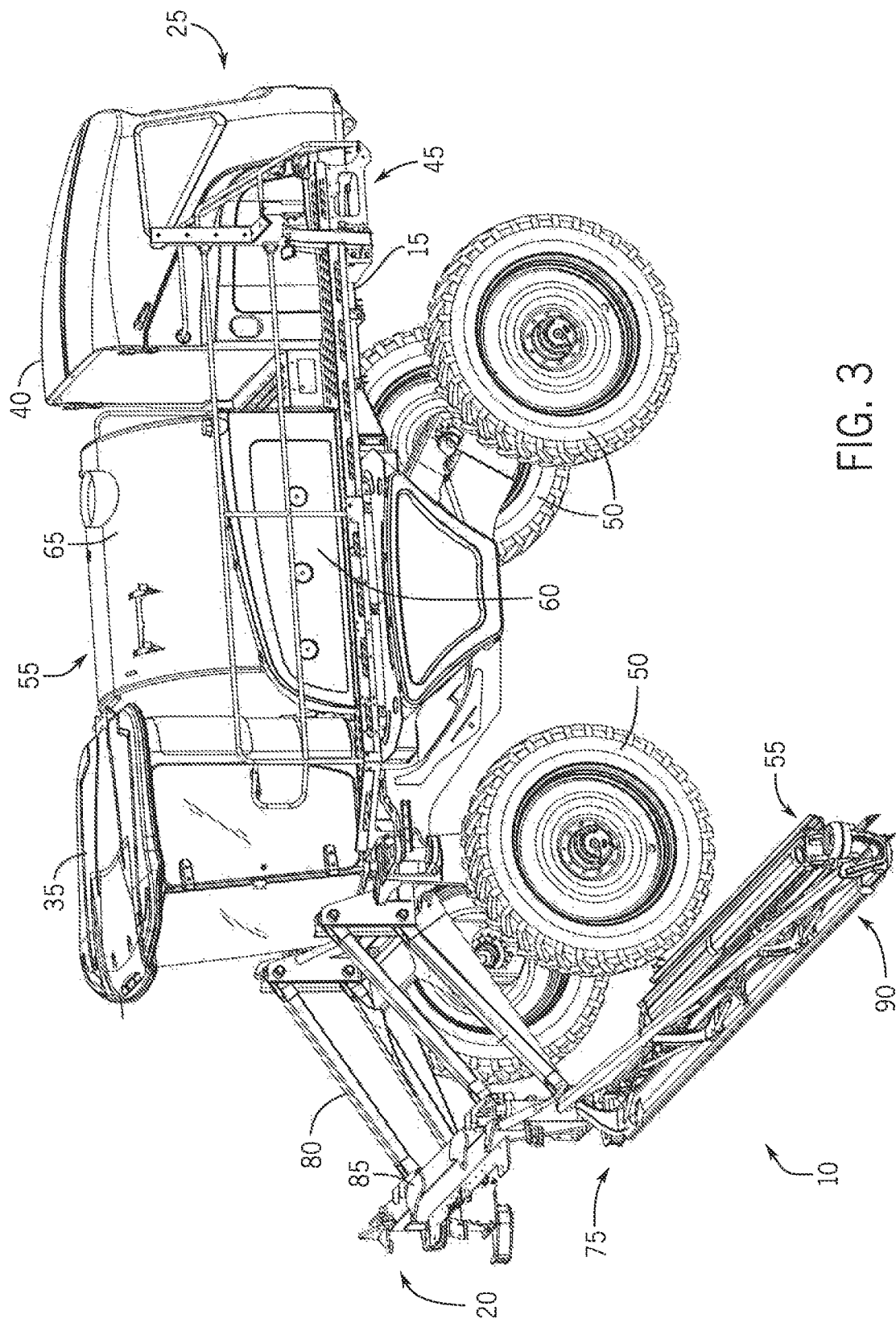
FIG. 3 is an isometric view from the second perspective of the front-boom sprayer of FIG. 1, where the boom is in a lowered position, the right boom arm is removed, the first boom arm segment of the left boom arm is in the extended positioned, and the second and third boom arm segments of the left boom arm are in the retracted position.
Figure 4:
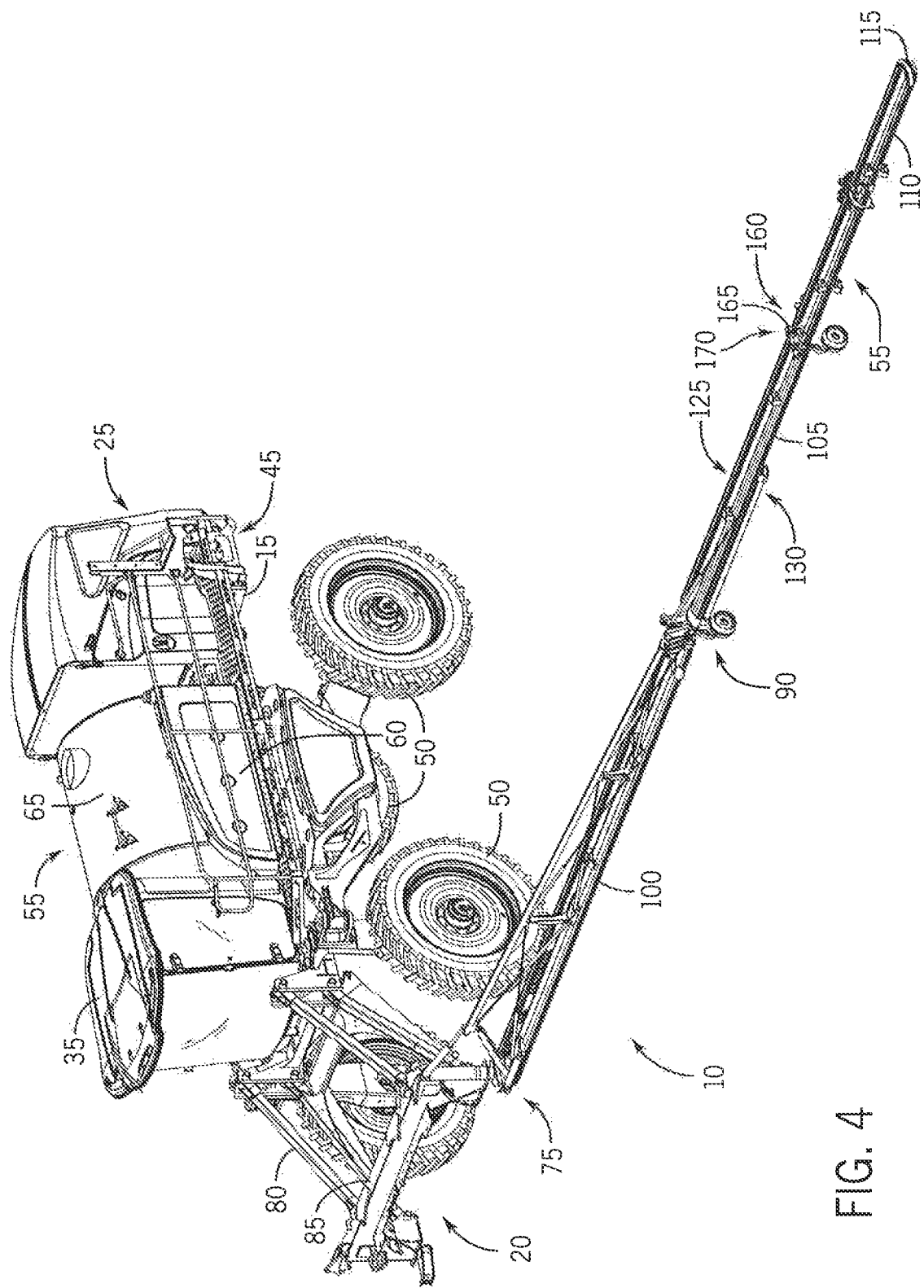
FIG. 4 is an isometric view from the second perspective of the front-boom sprayer of FIG. 1, where the boom is in the lowered position, the right boom arm is removed, and the left boom arm is in a fully extended position.

FIGS. 2 and 3 show the left boom arm 90 in a first extended, spray position, where only the first segment 100 of the left boom arm 90 is extended. Moreover, FIG. 2 shows the left boom arm 90 at a first spray height and FIG. 3 shows the left boom arm at a second spray height. FIG. 4 shows the left boom arm in a second extended, spray position, where all of the first, second, and third segments 100-110 are extended. The boom center segment and/or the first, second, and third boom arm segments 100-110 are configured with actuators (or linear motors) to allow the left boom arm 90 to fold and extend as necessary for operation.

With reference to FIG. 2, the first boom arm segment 100 (or primary segment) has an inner end 135 that is connected with hinge 140 to the boom center section 85. The hinge 140 is configured to allow for generally forward/rearward horizontal pivoting of the first boom arm segment 100, and consequently second and third boom arm segments 105 and 110, away/toward the chassis 15 when pivoting the first boom arm segment 100.

The second boom arm segment 105 (or secondary segment) has an inner end 145 that is connected with hinge 150 to the outer end 155 of the first boom arm segment 100. The hinge 150 is a multi-axis linkage that is configured to allow for generally rotating the second boom arm segment 105, and consequently third boom arm segment 110, away/toward the first boom arm segment 100 when pivoting the second boom arm segment 105.

With reference to FIG. 4, the third boom arm segment 110 has an inner end 160 that is connected with hinge 165 to the outer end 170 of the second boom arm segment 100. The hinge 165 is configured to allow for generally rotating the third boom arm segment 110 away/toward the second boom arm segment 105 when pivoting the third boom arm segment 110.

The first boom arm segment 100 has a truss arrangement. Included with the truss arrangement is a longitudinal tube 175 (FIG. 6), which is one example of a tube in the truss arrangement. Aspects of the invention are discussed in connection with the longitudinal tube 175, but can be used in many other tube or truss arrangements.

Figure 5:
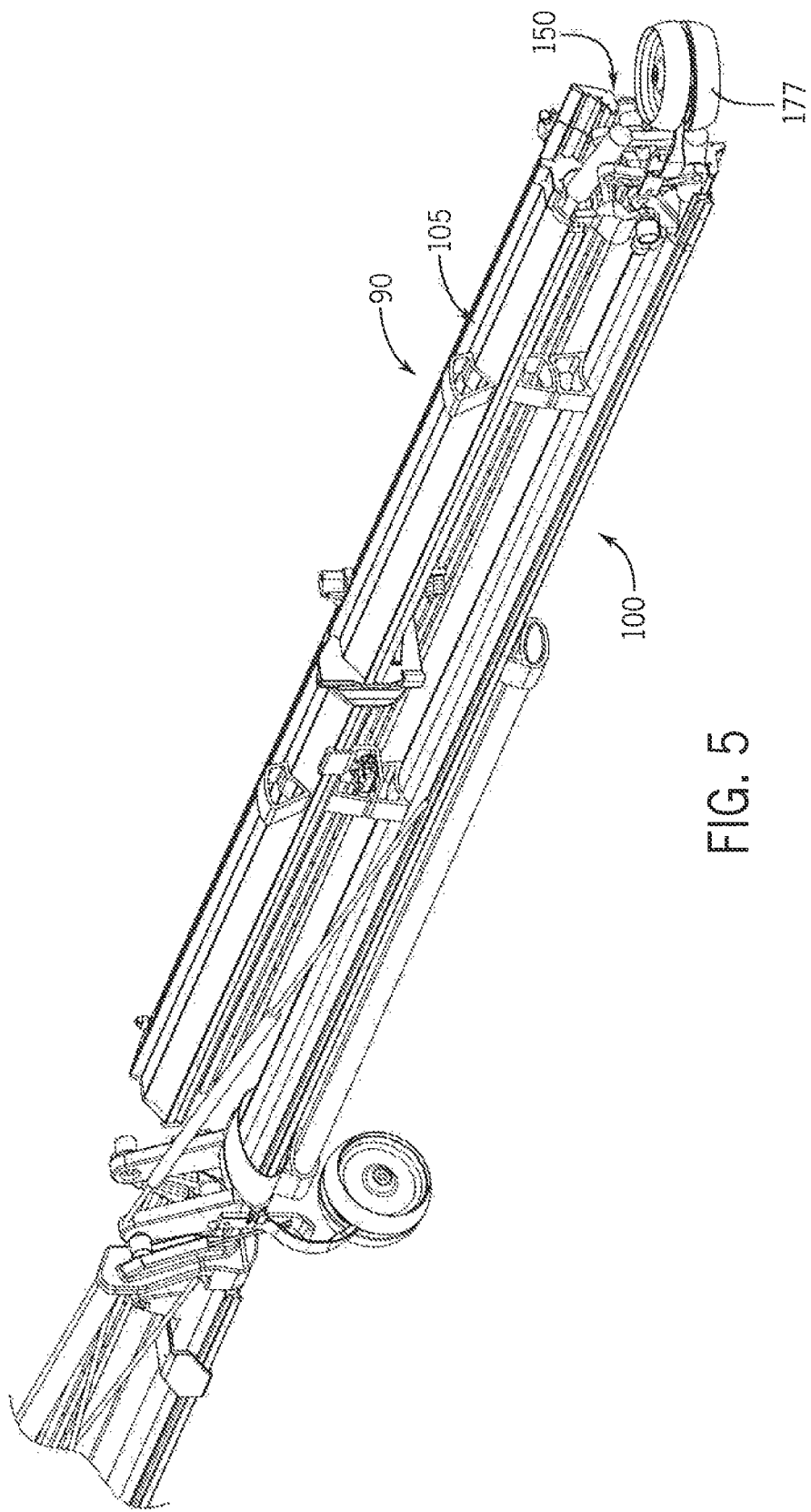
FIG. 5 is an enlarged isometric view of a portion of the lift boom arm of FIG. 4 according to some aspects of the present invention.
Figure 6:
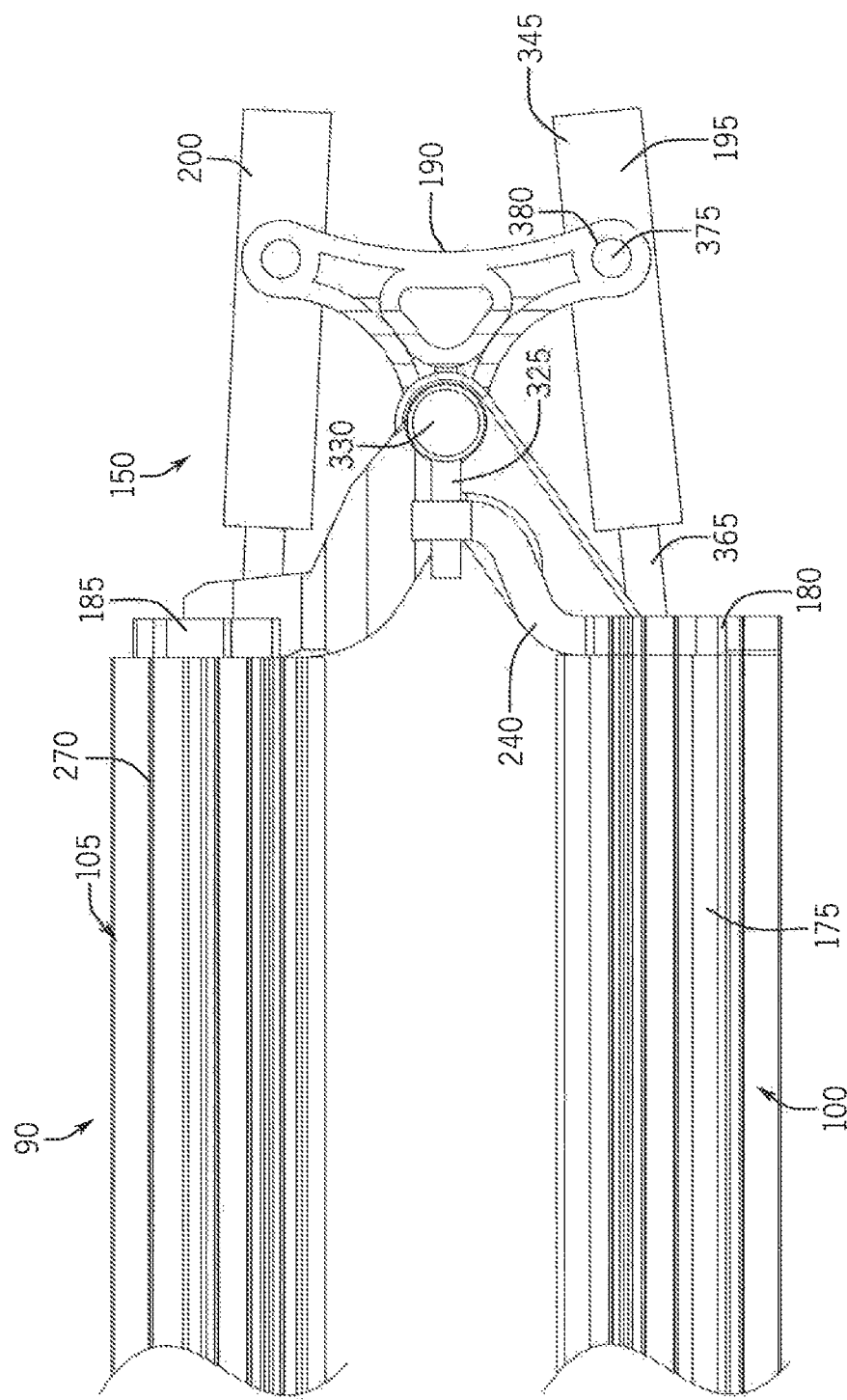
FIG. 6 is a side view of a portion of the lift boom arm of FIG. 5.
Figure 7:
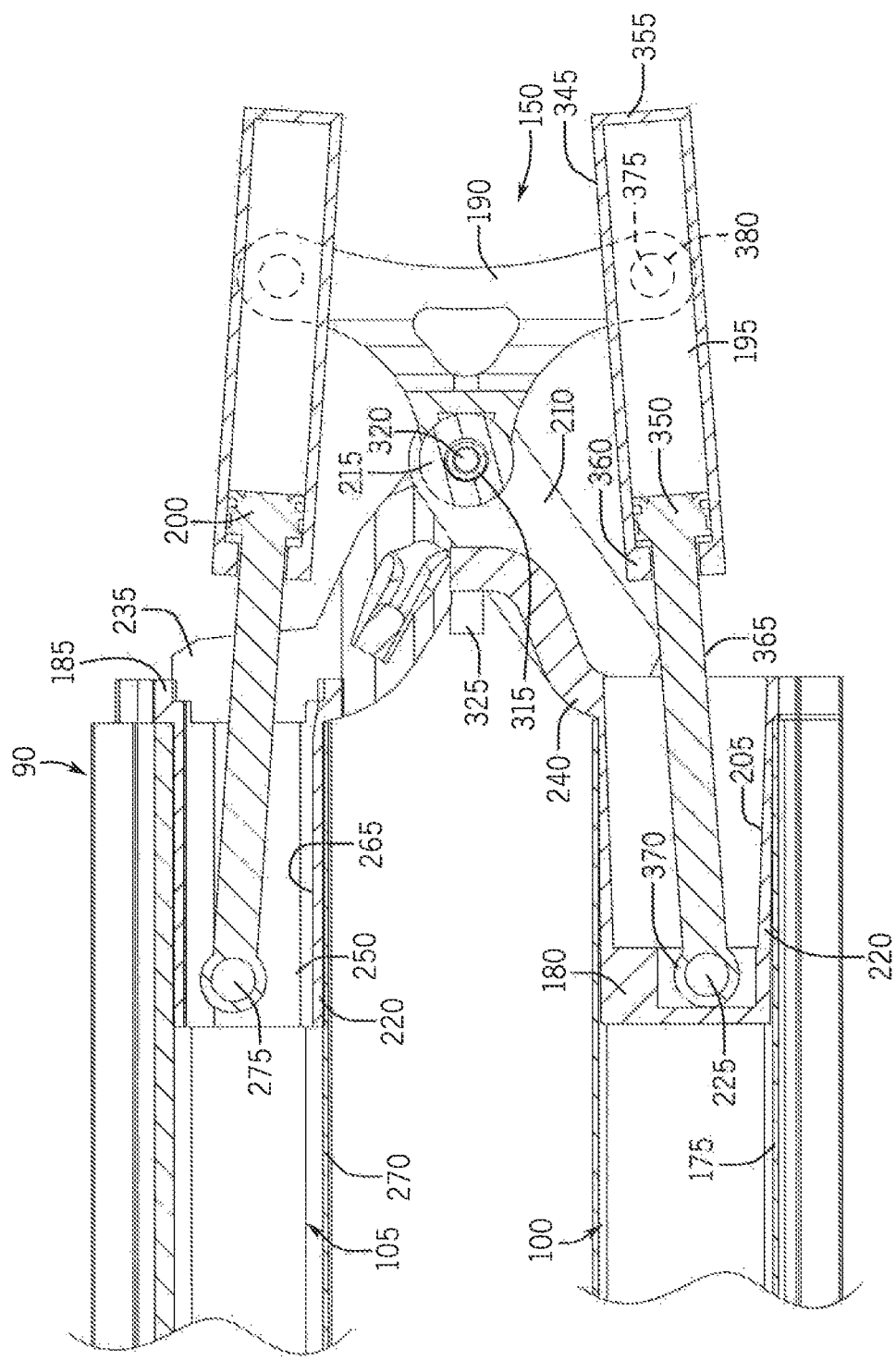
FIG. 7 is a mixed cross-sectional view/side view of the portion of the lift arm shown in FIG. 6.
Figure 8:
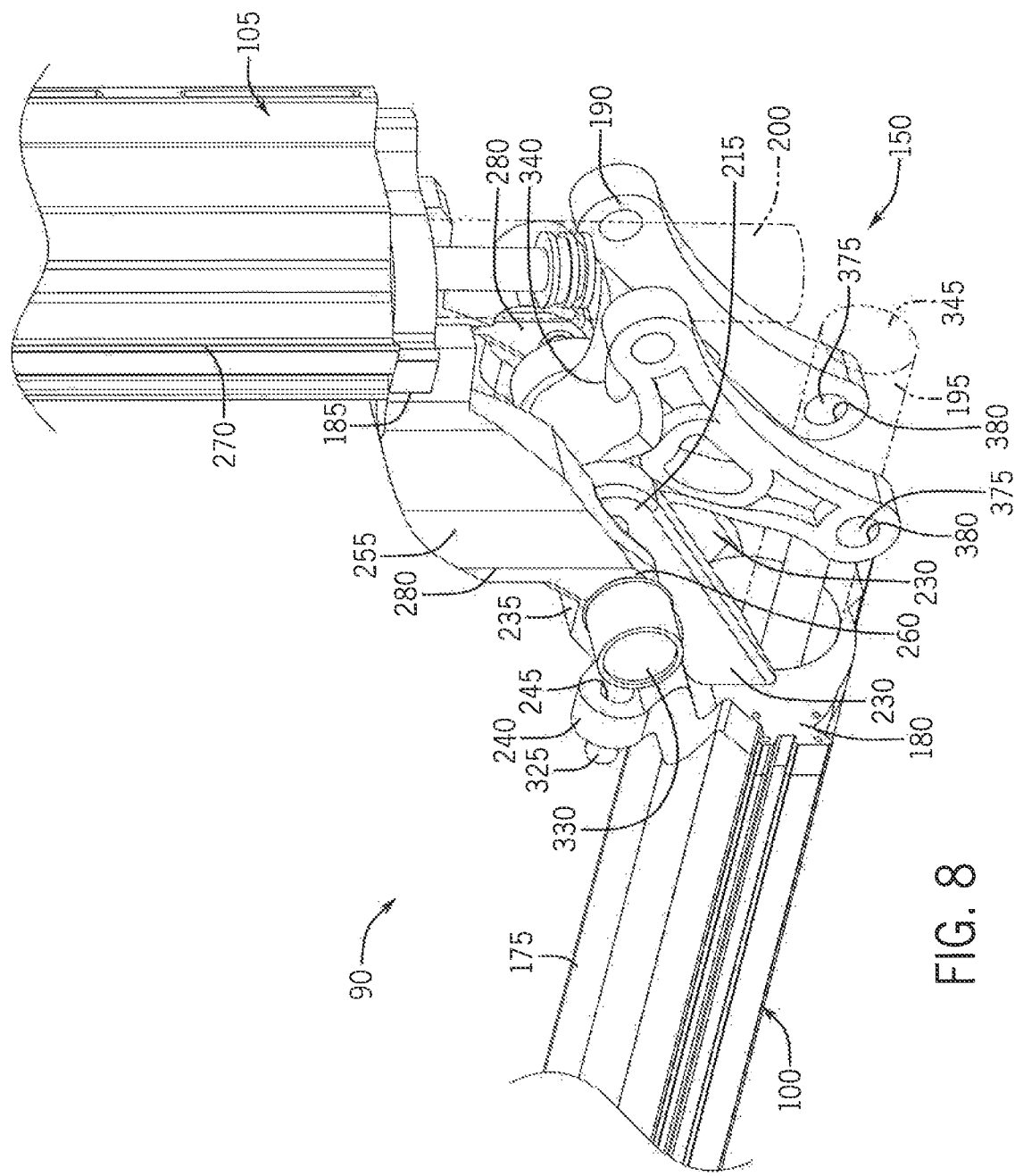
FIG. 8 is an enlarged isometric view of a portion of the lift boom arm of FIG. 4 in a partially deployed position.
Figure 9:
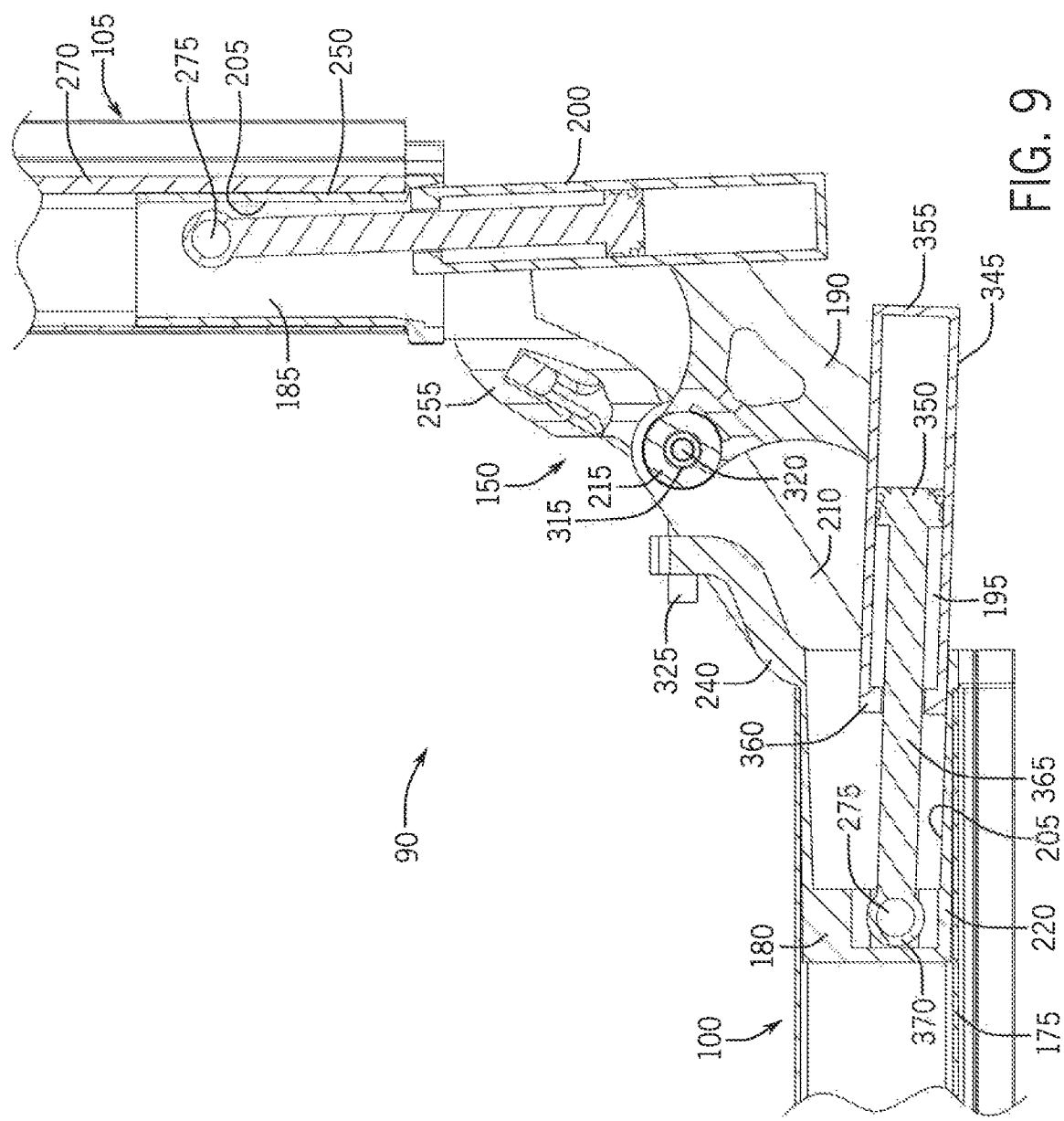
FIG. 9 is a mixed cross-sectional view/side view of the lift arm shown in FIG. 8.
Figure 10:
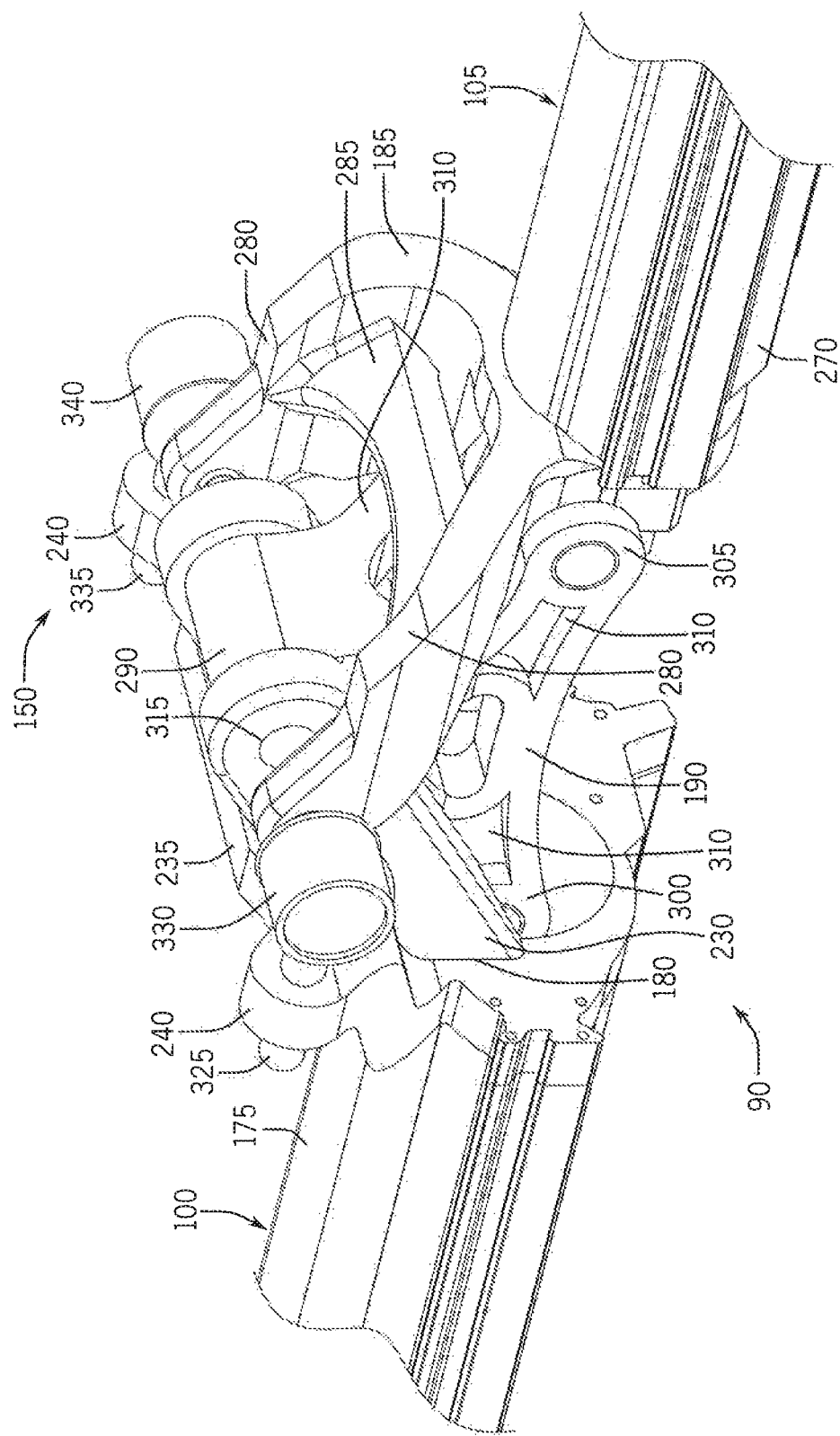
FIG. 10 is an enlarged isometric view of a portion of the lift boom arm of FIG. 4 in an extended or deployed position.
Figure 11:
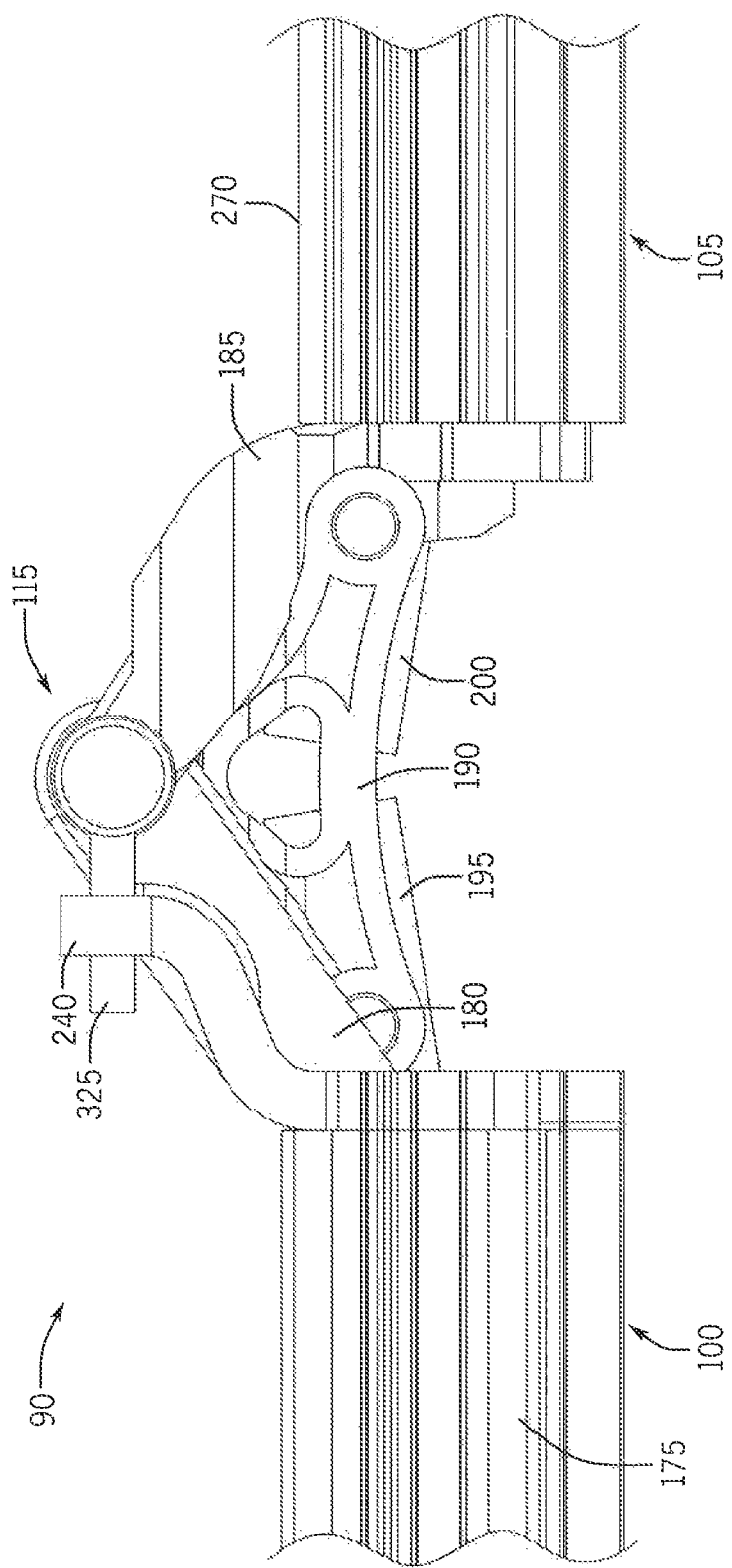
FIG. 11 is a side view of the lift boom arm of FIG. 10.
Figure 12:
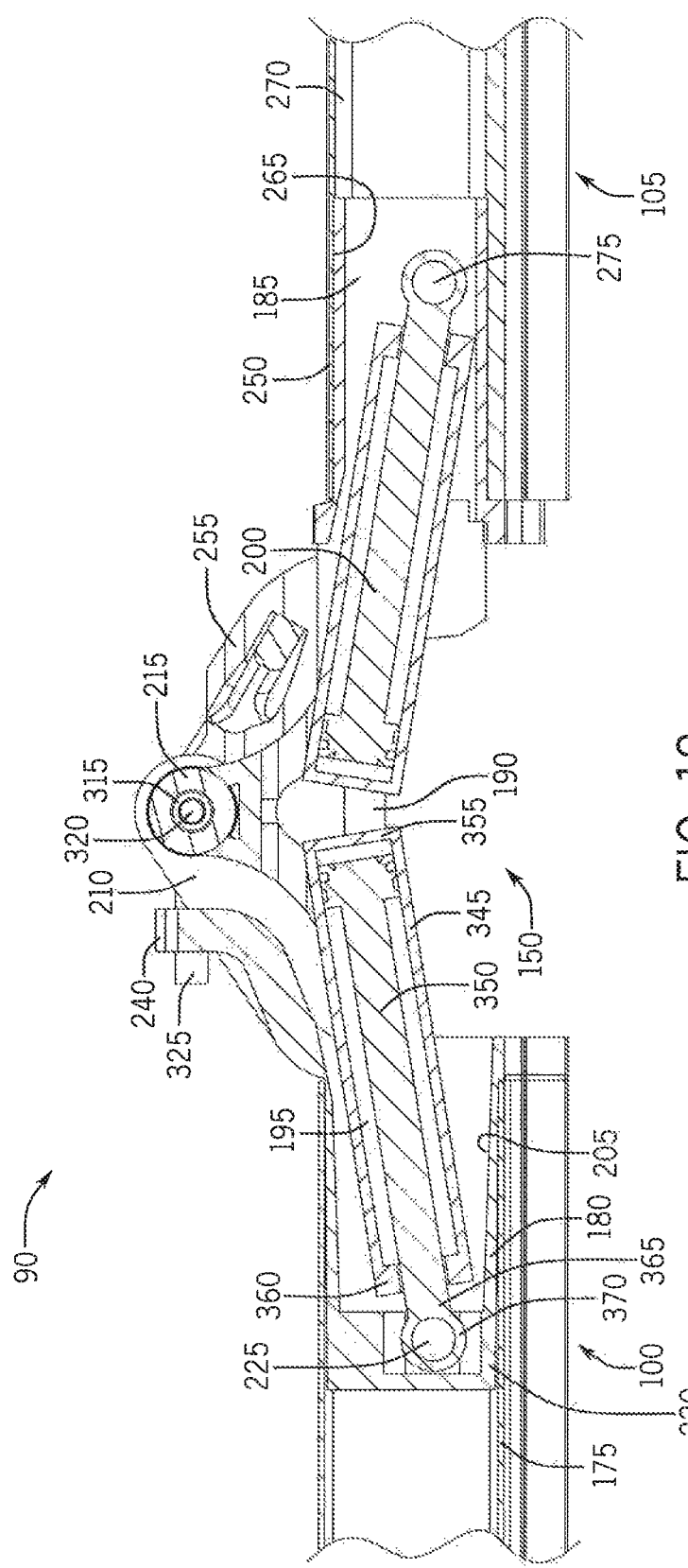
FIG. 12 is a mixed cross-sectional view/side view of the lift arm shown in FIG. 10.
Figure 13:
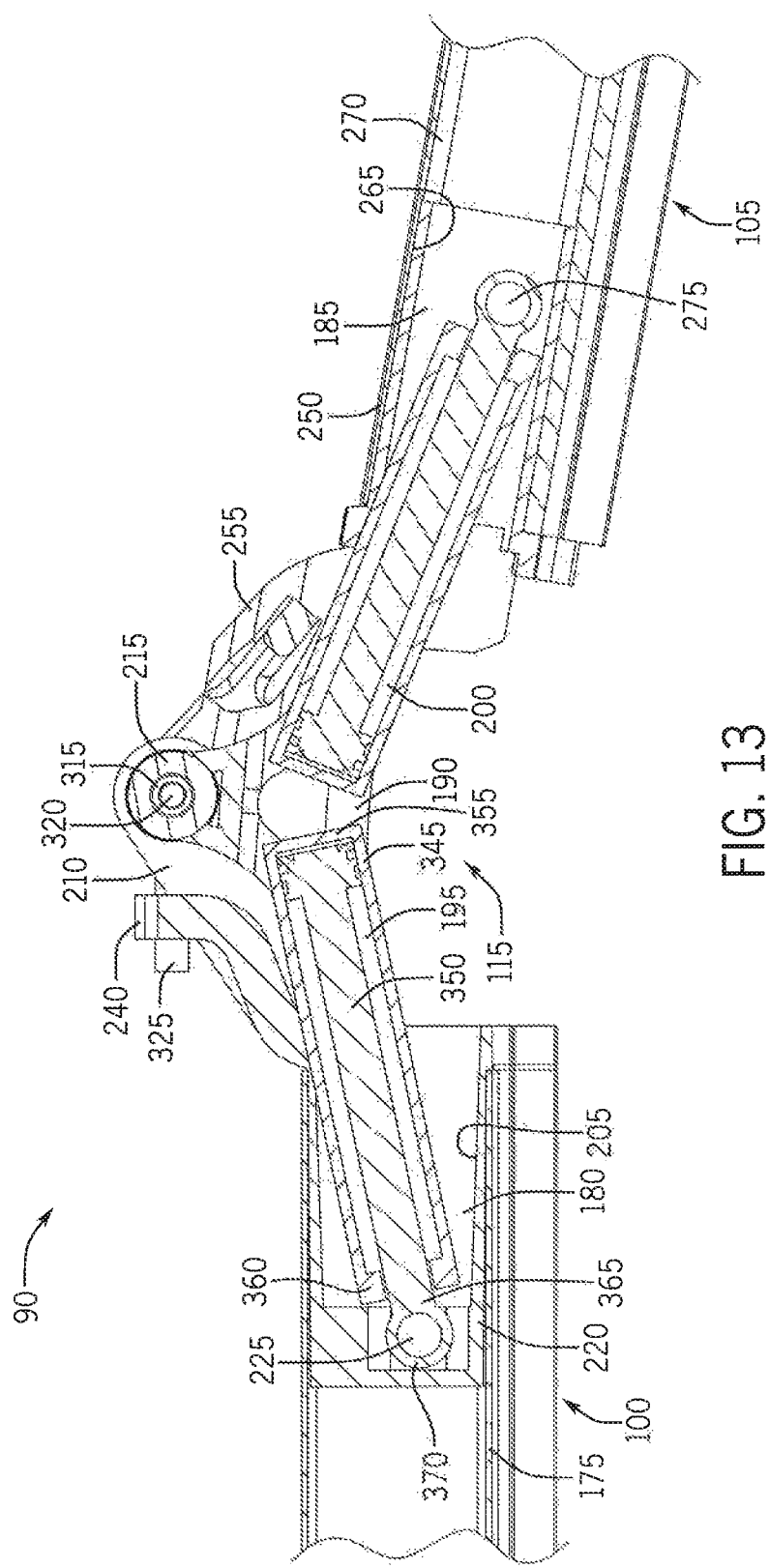
FIG. 13 is a mixed cross-sectional view/side view of a portion of the lift arm of FIG. 4 in a greater than 180 degree position.

FIGS. 5-13 provide further detail for the hinge 150 (may also be referred to as the multi-axis linkage 150). FIG. 5 shows an exploded isometric view of the multi-axis linkage 150 where the left boom arm 90 is in a lowered position, the first boom arm segment 100 of the left boom arm 90 is in the extended positioned, and the second boom arm segment 105 of the left boom arm 90 is in the retracted position. Also shown in FIG. 5 is a boom wheel 177. FIGS. 6-13 show the multi-axis linkage 1150 in various states; however, FIGS. 6-13 do not show all components of the left boom arm 90 for simplicity. FIGS. 6 and 7 show the second boom arm segment 105 in a retracted position. FIGS. 8 and 9 show the second boom arm segment 105 in the process of being deployed. FIGS. 10-12 shown the second boom arm segment 105 in an extended or deployed position. FIG. 13 shows the second boom arm segment 105 in a greater than horizontal (or greater than 180 degree position).

A detailed construction of the multi-axis linkage 150 is shown in FIGS. 6-13. The multi-axis linkage 150 includes a first ferrule link 180, a second ferrule link 185, a multipoint winged link 190, a first linear motor 195, and a second linear motor 200.

The first ferrule link 180 (best shown in FIG. 7) includes a ferrule portion 205, a leaf portion 210, and a knuckle portion 215. The ferrule portion 205 includes a ferrule 220 housed within the longitudinal tube 175, which may also be referred to as the primary tube 175. The ferrule 220 can be bonded, clamped, or press fit to the longitudinal tube 175. The ferrule 220 reinforces the longitudinal tube 175 loaded in compression or bending. The ferrule also includes a mount or connection point 225 for receiving a piston end (discussed below) of the first linear motor 195. The mount 225 can be a boss, for example.

The leaf portion 210 extends between and connects the ferrule portion 205 and the knuckle portion 215. The shown leaf portion 210 includes two leafs 230 (best seen in FIG. 8), but the number can vary. The leaf portion can also include a structural support, such as support 235, for providing mechanical stabilization to the first and second leafs 230. In some constructions, one of the ferrule links, e.g., the first ferrule link 180, can include tabs 240 having an aperture 245, respectively, for receiving pins (discussed below). The knuckle portion 215 includes apertures for receiving a bolt or pin, which is discussed further below.

The second ferrule link 185 includes a ferrule portion 250, a leaf portion 255, and a knuckle portion 260. The ferrule portion 250 includes a ferrule 265 housed within the longitudinal tube 270, which may also be referred to as the secondary tube 270. The ferrule 265 can be bonded, clamped, or press fit to the longitudinal tube 270. The ferrule 265 reinforces the longitudinal tube 270 loaded in compression or bending. The ferrule also includes a mounting point 275 for receiving a piston end (discussed below) of the second linear motor 200.

The leaf portion 255 extends between and connects the ferrule portion 250 and the knuckle portion 260. The shown leaf portion 255 includes two leafs 280 (best scene in FIG. 10), but the number can vary. The leaf portion 255 can also include a structural support, such as support 285, for providing mechanical stabilization to the first and second leafs 280. The knuckle portion 260 includes apertures for receiving a bolt or pin, which is discussed further below.

The multipoint winged link 190 includes a first knuckle portion 290 (best seen in FIG. 10), a tri-wing portion 295, a second knuckle portion 300, and a third knuckle portion 305. The tri-wing portion 295 includes a plurality of leafs 310 between and connecting the first, second, and third knuckle portions 290, 300, and 305. The number of leafs of the tri-wing portion 295 can vary. For the first construction shown, five leafs 310 are shown for coupling the first, second, and third knuckle portions 290, 300, and 305. The first knuckle portion 290 includes a single knuckle having an aperture, and the second and third knuckle portions 300 and 305 have two knuckles, respectively, having apertures. The leafs 310 of the tri-wing portion 295 form an housing-type structure for receiving a portion of the linear motors 190 and 195.

The knuckle portion 215 of the first ferrule link 180, the knuckle portion 260 of the second ferrule link 185, and the first knuckle portion 290 of the multipoint winged link are interleaved to form a cylinder 315 that receives a pin 320. The pin 320 holds the knuckles of the first ferrule link 180, the second ferrule link 185, and multipoint winged link 190 together. A second pin 325 connects to a first endcap 330 and a third pin 335 connects to a second endcap 340 to allow the pin 320 to join the interleave cylinder 315, first end endcap 330, and second end cylinder 340, thereby forming a barrel-type hinge.

The first and second linear motors 195 and 200 can be a hydraulic linear motor, Since the motors 195 and 200 are identical, only motor 195 will be described in detail. The linear motor 195 includes a cylinder barrel 345, in which a piston 350 moves back and forth. The cylinder 345 is closed on one end by a cylinder cap 355 and the other end by a cylinder head 360. The piston 350 includes a piston rod 365 that exists out of the cylinder head 360. The interior and operation of the linear motor 195 is conventional for hydraulic linear motors. That is, the hydraulic cylinder is the actuator or "motor" side of the system, and the "generator" side of the hydraulic system is the hydraulic pump that delivers a fixed or regulated flow of oil to the hydraulic cylinder, to move the piston 350. The operation of the first and second linear motors 195 and 200 can be individually or concurrently.

The first linear motor 195 includes the piston rod 365 having a connection point 370, which is connected to the ferrule portion 205 of the hinge 150. The connection point to the ferrule portion 205 is within the longitudinal tube 175. For example, the connection point 370 can be an aperture to receive the boss 225. A second connection point 370 of the second linear motor 200 is connected to the second ferrule link 185. For the shown construction, the first linear motor 195 includes bosses 375 that are received by apertures 380. The connection point 375 is located on the body of the cylinder 315 such that the linear motor is attached in a trunnion style. For example, if the cylinder 315 has a length L, the bosses 375 can be located between ten and fifty percent of the length from the cylinder cap 355. A trunnion cylinder design shortens the depth to which the cylinder needs to reach into the longitudinal tube or truss. If this is not an issue, other types of cylinders, such as a clevis type cylinder, can be implemented.

FIGS. 6 and 7 show the second boom arm segment 105 in a retracted position. As best seen in FIG. 7, the piston rods 365 of the linear motors 195 and 200 are fully extended. FIGS. 8 and 9 show the second boom arm segment 105 in the process of being deployed. The secondary tube 270 is at approximately ninety degrees with respect to the primary tube 175. As best seen in FIG. 9, the piston rods 365 of the linear motors 195 and 200 are slightly more than mid stroke. The control of the linear motors 195 and 200 can be individually controlled and do not need to be in concurrence as shown in FIG. 9. FIGS. 10-12 shown the second boom arm segment 105 in an extended or deployed position. The secondary tube 270 is at approximately 180 degrees with respect to the primary tube 175. As best seen in FIG. 12, the piston rods 365 of the linear motors 195 and 200 are almost fully compacted. FIG. 13 shows the second boom arm segment 105 in a greater than horizontal (or greater than 180 degree position). Longer booms have the potential of needing extra range of travel in the fold hinges in order to more closely follow the ground contours in the operating position. This arrangement overcomes the prior four-bar linkage limitations as to range of travel and leverage at the end of stroke. As best seen in FIG. 13, the piston rods 365 of the linear motors 195 and 200 are fully compacted. Each cylinder provides ninety-plus degrees of rotation. The multipoint winged link 190 proves an indeterminate solution, i.e., the link 190 can be in multiple positions with respect to the primary tube 175.

With reference to FIG. 11, the linear motors 195 and 200 are partially housed or within the primary and secondary tubes structures 175 and 270. Also, with the design of the tri-wing portion of the multipoint winged link 190, the linear motors 195 and 200 are partially surrounded, or housed, by the leaf portions 300 and 305. The result is that the multi-axis linkage creates a minimized frontal area for minimizing air disturbance when the second boom arm segment 105 is deployed and the sprayer 100 is moving.

Moreover, four-bar linkages of the prior art tend to loose mechanical leverage at the extreme limits of their functional range, and a large cylinder bore is often required to offset the loss of leverage. The disclosed multi-axis linkage produces a more consistent leverage through its travel range than known four-bar linkages. Therefore, even though two cylinders are required, they can be smaller in size and substantially more modest in cost and weight.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. A multi-axis linkage for use with a collapsible boom of an agricultural vehicle, the collapsible boom includes a first boom segment having a first truss and a second boom segment having a second truss, the multi-axis linkage comprising:
    a first linear motor having a piston rod, an end of the piston rod being coupled to and within an end of the first truss;
    a second linear motor having a piston rod, an end of the piston rod being coupled to and within an end of the second truss;
    a multipoint winged link having a first knuckle portion connected to the first linear motor, a second knuckle portion connected to the second linear motor, and a third knuckle portion coupled to the first boom segment and the second boom segment;
    a first link coupled between the first truss and the multipoint winged link; and
    a second link coupled between the second truss and the multipoint winged link.

2. The multi-axis linkage of claim 1, wherein:
    the first link includes a first portion coupled to the first truss, a knuckle portion coupled with the third knuckle portion of the multipoint winged link, and a leaf portion connecting the first portion and the knuckle portion of the first link; and
    the second link includes a first portion coupled to the second truss, a knuckle portion coupled with the third knuckle portion of the multipoint winged link and the knuckle portion of the first link, and a leaf portion connecting the first portion of the second link and the knuckle portion of the second link.

3. The multi-axis linkage of claim 2 wherein the third knuckle portion of the multipoint winged link includes a first aperture, the knuckle portion of the first link includes a second aperture, and the knuckle portion of the second link includes a third aperture, and
    wherein the multi-axis linkage further comprises a fastener passing through the first, second, and third apertures.

4. The multi-axis linkage of claim 2 wherein the first link is a first ferrule link and the second link is a second ferrule link.

5. The multi-axis linkage of claim 2 wherein the first truss includes a first longitudinal tube and the second truss includes a second longitudinal tube, wherein the first link is a first ferrule link and the first portion includes a ferrule connected within the first longitudinal tube, and wherein the second link is a second ferrule link and the second portion is includes a ferrule connected within the second longitudinal tube.

6. The multi-axis linkage of claim 5 wherein the end of the piston rod of the first linear motor is connected to the first ferrule, and wherein the end of the piston rod of the second linear motor is connected to the second ferrule.

7. The multi-axis linkage of claim 1 wherein the first linear motor includes a cylinder, a cap end, and a head end, the cylinder including a connection point away from the cap end, and the multipoint winged link is connected to the connection point of the first linear motor, and
    wherein the a second linear motor includes a cylinder, a cap end, and a head end, the cylinder including a connection point away from the cap end, and the multipoint winged link is connected to the connection point of the second linear motor.

8. The multi-axis linkage of claim 7 wherein the cylinder of the first linear motor has a length starting from the cap end to the head end, the connection point of the first linear motor being between ten and fifty percent of the length from the cap end, and
    wherein the cylinder of the second linear motor has a length starting from the cap end to the head end, the connection point second linear motor being between ten and fifty percent of the length from the cap end.

9. An agricultural vehicle having a collapsible boom, the agricultural vehicle comprising:

a first boom segment having a first truss;
a first linear motor having a piston rod, the end of the piston rod being coupled to and within an end of the first truss;
a second boom segment having a second truss;
a second linear motor having a piston rod, the end of the piston rod being coupled to and within an end of the second truss;
a multipoint winged link having a first knuckle portion connected to the first linear motor, a second knuckle portion connected to the second linear motor, and a third knuckle portion coupled to the first boom segment and the second boom segment;
a first link coupled between the first truss and the multipoint winged link; and
a second link coupled between the second truss and the multipoint winged link.

10. The agricultural vehicle of claim 9 wherein:
the first truss includes a first longitudinal tube and the second truss includes a second longitudinal tube;
the first link is a first ferrule link having a ferrule portion with a ferrule connected within the first longitudinal tube, a knuckle portion coupled with the third knuckle portion of the multipoint winged link, and a leaf portion connecting the ferrule portion and the knuckle portion of the first ferrule link; and
the second link is a second ferrule link having a ferrule portion with a ferrule connected within the second longitudinal tube, a knuckle portion coupled with the third knuckle portion of the multipoint winged link and the knuckle portion of the first ferrule link, and a leaf portion connecting the ferrule portion of the second ferrule link and the knuckle portion of the second ferrule link.

11. The agricultural vehicle of claim 10 wherein the third knuckle portion of the multipoint winged link includes a first aperture, the knuckle portion of the first ferrule link includes a second aperture, and the knuckle portion of the second ferrule link includes a third aperture, and
wherein the agricultural vehicle further comprises a fastener passing through the first, second, and third apertures.

12. The agricultural vehicle of claim 10 wherein the end of the piston rod of the first linear motor is connected to the first ferrule, and wherein the end of the piston rod of the second linear motor is connected to the second ferrule.

13. The agricultural vehicle of claim 9 wherein the first linear motor includes a cylinder, a cap end, and a head end, the cylinder including a connection point away from the cap end, and the multipoint winged link is connected to the connection point of the first linear motor, and
wherein the second linear motor includes a cylinder, a cap end, and a head end, the cylinder including a connection point away from the cap end, and the multipoint winged link is connected to the connection point of the second linear motor.

14. The agricultural vehicle of claim 13 wherein the cylinder of the first linear motor has a length starting from the cap end to the head end, the connection point of the first linear motor being located between ten and fifty percent of the length from the cap end, and
wherein the cylinder of the second linear motor has a length starting from the cap end to the head end, the connection point of the second linear motor being located between ten and fifty percent of the length from the cap end.

15. A multi-axis linkage for use with a collapsible boom of an agricultural vehicle, the collapsible boom includes a first boom segment having a primary tube and a second boom segment having a secondary tube, the multi-axis linkage comprising:
a first ferrule link having a ferrule portion with a ferrule coupled in the primary tube, a knuckle portion, and a leaf portion connecting the ferrule portion and the knuckle portion;
a second ferrule link having a ferrule portion with a ferrule coupled in the secondary tube, a knuckle portion, and a leaf portion connecting the ferrule portion and the knuckle portion;
a first linear motor having a piston rod, the end of the piston rod being connected to the ferrule of the first ferrule link within the primary tube;
a second linear motor having a piston rod, the end of the piston rod being connected to the ferrule of the second ferrule link within the secondary tube;
a multipoint winged link having a first knuckle portion connected to the first linear motor, a second knuckle portion connected to the second linear motor, and a third knuckle portion coupled to the knuckle portion of the first ferrule link and the knuckle portion of the second ferrule link.

16. The multi-axis linkage of claim 15 wherein the wherein the third knuckle portion of the multipoint winged link includes a first aperture, the knuckle portion of the first ferrule link includes a second aperture, and the knuckle portion of the second ferrule link includes a third aperture, and
wherein the multi-axis linkage further comprises a fastener passing through the first, second, and third apertures.

17. The multi-axis linkage of claim 15 wherein the first linear motor includes a cylinder, a cap end, and a head end, the cylinder including a connection point away from the cap end, and the multipoint winged link is connected to the connection point of the first linear motor, and wherein the second linear motor includes a cylinder, a cap end, and a head end, the cylinder including a connection point away from the cap end, and the multipoint winged link is connected to the connection point of the second linear motor.

18. The multi-axis linkage of claim 17 wherein the cylinder of the first linear motor has a length starting from the cap end to the head end, the connection point of the first linear motor being located between ten and fifty percent of the length from the cap end, and wherein the cylinder of the second linear motor has a length starting from the cap end to the head end, the connection point of the second linear motor being located between ten and fifty percent of the length from the cap end.

* * * * *